United States Patent Office 2,720,228
Patented Oct. 11, 1955

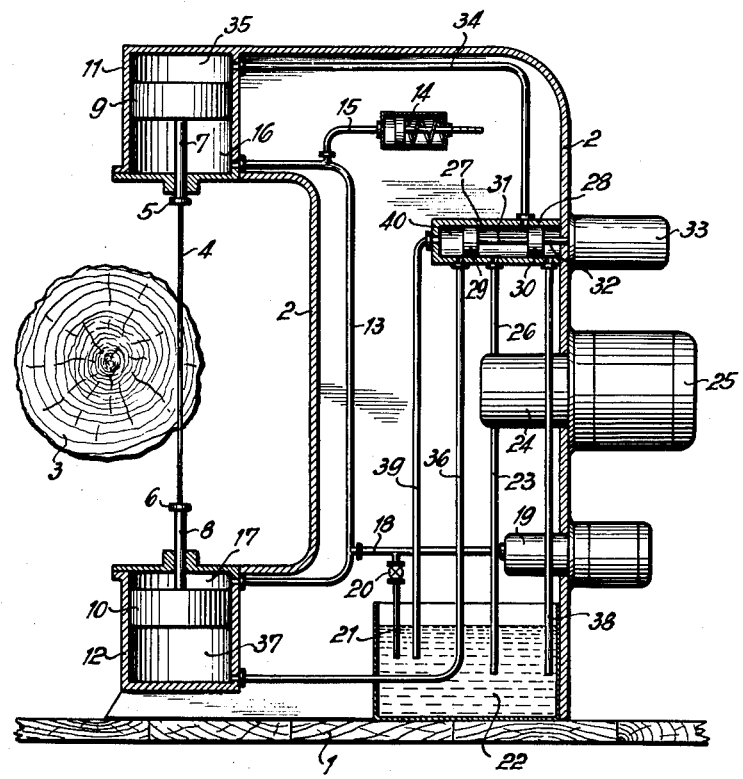

2,720,228
SAWS HAVING HYDRAULICALLY TENSIONED AND RECIPROCABLE CUTTING TOOLS

Josef Traben, Oberkirch, Germany, assignor to Gebruder Linck Maschinenfabrik und Eisengiesserei "Gatterlinck," Oberkirch, Germany Application March 2, 1954, Serial No. 413,557

5 Claims. (Cl. 143—80)

This invention relates to saws having reciprocable cutting tools.

For the cutting up of tree trunks or planks use is generally made of vertical or horizontal frame saws or larger band saws, for example so-called block band saws. On account of the fly masses and stilts hitherto used for them, frame saws have the disadvantage that the various structural parts of the saw must be made very stable and consequently heavy. The balancing fly masses require a relatively large amount of material and additional expenditure of power, which must be covered by the source of driving power. Vertical frame saws have furthermore the disadvantage that for the accommodation of the driving parts they require special underground space, while horizontal frame saws on the contrary need a great amount of space extended horizontally on the installation site.

Block band saws also have various considerable disadvantages. If the trunk or block is to be cut out by more than one saw band during the same travel, only a second saw of practically exactly similar construction can be disposed on the opposite side of the first saw, whereby an extremely complicated, heavy and expensive arrangement is produced. In addition, since the saw blades must have a determined resistance moment and thus a certain cross-section, they cannot be bent below a determined, so-called minimum bending angle, which angle in turn determines the diameter of the band guide and driving rollers; that is to say, these rollers must almost always be very large and heavy. The band path and the rollers occupy a great deal of space and require large, heavy and expensive foundations and underground accommodation. These disadvantages almost always prevent the extensive use of block band saws, which are advantageous in particular for working wood on account of the relatively high cutting speed. The bands must be heavily, uniformly and dependably pre-stressed, thus requiring a high degree of accuracy in the machine, because these requirements can only be fulfilled to a satisfactory extent by very sensitive and expensive supplementary equipment. The relatively long and moreover expensive saw bands, the cross-sections of which are extremely sensitive to breakage at even a slight over-load on account of the teeth, can also lead to very serious danger to the operators in the event of breakage, in addition to the complete loss of the saw band. The machine and particularly the saw blades furthermore require considerable maintenance and attention.

These disadvantages almost always preclude the use of block band saws, which are well suited for many purposes, and which are in particular advantageous for working wood on account of the relatively high cutting speed.

It has now been found that a saw can be produced in surprisingly simple manner which is particularly suitable for dividing up trunks, thick planks and blocks of all types and sizes, and which at the same time is more powerful, simpler, smaller, more reliable and less expensive. To this end, for a saw with reciprocating saw blades the two ends of the saw blades are suspended in fastenings hydraulically tensioned against one another. At least one fastening of the saw blade or blades can be moved to and fro in known manner by a stilt driven by a fly-mass.

Using a saw according to the invention, heavy and expensive saw frames, which may have a weight of more than 1,000 kg., can be dispensed with, so that accordingly the driving forces and any balancing forces required can also be made substantially smaller. If, for example, one of the two fastenings of the hydraulically tensioned saw blades is moved to and fro by a stilt which is coupled to a fly-mass, the stilt and the fly-mass can be made far lighter than in known frame saws. In addition, only a far smaller driving power is required.

The small weight of the two fastening means with the saw blade clamped in nevertheless enables the stilt and the fly-mass, which as a crank drive always more less unfavourably influence the operation of the saw, to be dispensed with entirely, and other sources of driving power may be used instead.

For this purpose a source of tractive and/or pressure force having a translational effect and free from fly-mass equalisation, for example an electromagnetic, hydraulic or pneumatic source of power, is used as the source of driving power for the saw, and by means of the same the fastenings are moved to and fro as in a conventional saw frame.

With sources of power of this type, for example with one or more electromagnets or with a hydraulic piston having a single or double action, the fastenings together with the saw blades can be moved to and fro exactly in the direction of their guides at a relatively very high speed, so that a saw according to this invention is in particular very suitable as a block band saw.

When using hydraulic driving means, a piston acted on on both sides in a cylinder on at least one of the fastenings of the saw blade or blades is preferably used, said cylinder being equipped with inlet and outlet pipes for the hydraulic medium, while the control of these pipes is synchronised with the movements of the saw blade fastenings. A pipe is connected to each end of the cylinder chamber and the two pipes are connected to a pump, so that when the pump is reversed, one side of the piston is exposed to pressure, and at the same time the other side of said piston is exposed to suction. The pump is fed from a storage tank and circulates the hydraulic medium back to said tank.

For the purpose of tightening the saw blade or blades, a hydraulic piston is for example mounted on each fastening of the saw blade, while the mutually facing surfaces of the two pistons tighten the saw blade or blades by hydraulic action. The hydraulic device is so constructed that the hydraulic column situated between the mutually facing surfaces of the pistons participates in the reciprocating movement of the saw blade or blades through the pipe connecting the cylinders of said pistons, while the tensioning force remains unchanged.

In order to keep this tensioning force unchanged, the pipe connecting the two cylinders is equipped according to the invention with a pressure chamber or the like which keeps the pressure or tensional force of the hydraulic medium constant. The chamber or the connecting pipe is advantageously provided with a pressure indicator.

In order to maintain the necessary tensioning force of the hydraulic medium tensioning the saw blades a special pressure pump is also advantageously provided which is connected to the pipe connecting the two cylinders and fed from a storage tank.

One embodiment of a saw according to the invention is hereinafter described, by way of example, with reference to the accompanying drawing, which illustrates diagrammatically the construction of the saw.

On the base 1 rests the approximately C-shaped pillar 2 of a block saw for cutting up a trunk 3. The C-shaped pillar enables the opening width and depth of the aperture for the passage of the trunk to be selected in accordance with the diameter of the latter, that is to say, to be made relatively very large, while the saw pillar, on account of the relatively small masses of the saw blades and their fastenings, can be made considerably lighter than in known frame or block saws of the same aperture width. The power of the new saw is at the same time considerably greater than that of known saws and in addition the new saw runs substantially more quietly.

The saw blade 4 is connected by fastenings 5, 6 to the piston rods, 7 and 8 respectively, of the two pistons 9 and 10 in the cylinders 11 and 12. The two cylinders are accommodated on or in the saw pillar 2. As shown in the drawing, the hydraulic pipes are preferably all accommodated inside the pillar.

For the hydraulic tensioning of the saw blade 4 the two cylinders 11, 12 are connected together through a hydraulic pipe 13, these pipes being connected to the cylinder chambers at the mutually facing ends of the two cylinders 11 and 12. A spring-loaded pressure piston 14 permits an alteration of the tensioning force of the hydraulic medium in the pipe 13 and the two cylinder chambers 16 and 17 through the pipe 15 connected to the connecting pipe 13, the magnitude of this force varying according to the movements of the pistons 9 and 10.

Through the tensioning force of the hydraulic medium in the pipe 13 and the two cylinder chambers 16 and 17, the pistons 9 and 10 are loaded in opposite directions so that they tend to be forced apart and thereby tighten the saw blade 4. The degree of this tightening can be regulated by the pressure piston 14. The hydraulic column formed by the cylinder chamber 17 moves together with the pistons 9, 10 and the saw blade 4.

For the purpose of feeding this hydraulic system another pipe 18 is connected to the pipe 13 and is connected to a pump 19, driven for example by an electric motor, and through the valve 20 and the pipe 21 to the oil chamber 22.

From this chamber 22 a section of pipe 23 leads to another pump 24 driven by an electric motor 25. The pump, constructed for example as a centrifugal pump, forces the hydraulic medium through the pipe 26 into the chamber 27 of a control cylinder 28, in which the two control pistons 29 and 30 run, which are rigidly connected together through a rod 31. By means of another rod 32 the control pistons, driven by a source of power 33, are synchronised with the movements of the saw blade 4.

The hydraulic medium passes out of the control cylinder 28 through the pipe 34 into the chamber 35 of the tensioning and working cylinder 12. Through the two pipes 38 and 39 the oil is returned from the control cylinder into the oil tank 22, from which it is recirculated through the suction pipe 23 to the hydraulic pump 24.

In the working position of the control pistons 29, 30, as illustrated in the drawing, the oil passes out of the chamber 22 through the pipe 23 into the pump 24, and further through the pipe 26 into the chamber 27 of the control cylinder 28 and further through the pipe 34 into the chamber 35 of the tensioning and working cylinder 11. The piston 9 is pressed downwards, thus acting also through the hydraulic tensioning system 16, 13, 17, on the bottom piston 10, from the chamber 37 of which the oil passes through the pipe 36 into the chamber 40 of the control cylinder 28 and thence through the return pipe 39 into the oil chamber 22.

As soon as the two pistons 9 and 10 have arrived at the bottom end of their cylinders 11 and 12, respectively, the control cylinder 28 is reversed by means of a device (not illustrated) working in dependence on the pistons 9 and 10 and on the saw 4, so that the pipe 34 is disconnected from the pressure pipe 26 and the pipe 36 is connected to the latter. For this purpose the two control pistons 29 and 30 are moved to the left. Through this movement the pipe 34 is at the same time connected to the return pipe 38. The oil coming from the pump 24 now presses the piston 10 upwards again through the pipe 26, the chamber 27 and the pipe 36.

I claim:

1. A block saw having a reciprocable cutting tool, comprising a frame, at least one saw blade reciprocably mounted in said frame, blade fastening means hydraulically tensioned against one another and located one at each end of said saw blade, and hydraulic driving means mounted on at least one of said blade fastening means, said blade fastening means each having mounted thereon a piston which pistons have mutually facing surfaces, cylinders mounted on said frame in which said pistons are slidable, a pipe connecting said cylinders, a constantly working tensioning pump separate from said hydraulic driving means connected to said pipe and adapted to provide a column of hydraulic medium situated between the mutually facing surfaces of said pistons to tension the saw during reciprocation, said column of hydraulic medium being movable to and fro through said pipe connecting said cylinders in synchronism with the movement of said saw blade while the tension in the saw blade remains unchanged.

2. A saw as claimed in claim 1 wherein the pipe connecting the cylinders for the hydraulic tensioning medium is provided with a device to keep the hydraulic pressure constant, said device having a pressure chamber and regulator.

3. A saw having a reciprocable cutting tool, comprising a frame, at least one saw blade reciprocably mounted in said frame, blade fastening means hydraulically tensioned against one another and located one at each end of said saw blade, hydraulic driving means mounted on at least one of said blade fastening means, said blade fastening means each having mounted thereon a piston which pistons have mutually facing surfaces, cylinders mounted on said frame in which said pistons are slidable, a pipe connecting said cylinders, and there being provided a column of hydraulic medium situated between the mutually facing surfaces of said pistons to tension the saw during reciprocation, said column of hydraulic medium being movable to and fro through said pipe connecting said cylinders in synchronism with the movement of said saw blade, a compensating cylinder connected to said pipe to keep the hydraulic pressure constant, a constantly working tensioning pump having a supply pipe and a storage chamber for said hydraulic medium, said tensioning pump being separate from said hydraulic driving means and connected to said pipe connecting the cylinders for providing said column of hydraulic medium therein and said supply pipe of said pump being fed from said storage chamber.

4. Saw-mill having two spaced hydraulic cylinders, pistons movable in the cylinders, a saw tool tensioned between the pistons, pressure chambers on both sides of the pistons in the cylinders, a connecting pipe between the pressure chambers of said cylinders which mutually face each other, a constantly working tensioning pump connected to said connecting pipe and adapted to produce a pressure which holds the saw tool tensioned during reciprocation, a control valve connected through separate pipes to the other of said pressure chambers of said cylinders which comprise the working chambers, a working pump for feeding hydraulic medium for the working chambers to the control valve, a source of power for controlling the control valve and a common oil vessel for the feed of the tensioning pump and the working pump.

5. Saw-mill according to claim 4, in which a compensating cylinder for regulation of the tensioning pressure is connected to the connecting pipe between the mutually facing pressure chambers.

References Cited in the file of this patent

UNITED STATES PATENTS

| | | |
|---|---|---|
| 541,160 | Garland | June 18, 1895 |
| 680,136 | Evered | Aug. 6, 1901 |
| 720,944 | Meiklejohn | Feb. 17, 1903 |
| 2,114,241 | Tosten | Apr. 12, 1938 |
| 2,182,289 | Eisenlohr | Dec. 5, 1939 |
| 2,414,519 | Greene | Jan. 21, 1947 |
| 2,420,406 | Andrews et al. | May 13, 1947 |
| 2,613,701 | Nathan | Oct. 14, 1952 |